United States Patent
Oyman et al.

(10) Patent No.: US 9,774,465 B2
(45) Date of Patent: Sep. 26, 2017

(54) MEDIA CONTENT STREAMING

(71) Applicant: INTEL CORPORATION, Santa Clara, CA (US)

(72) Inventors: Ozgur Oyman, San Jose, CA (US); Ahmed Helmy, October (EG); Ahmed N. Ragab, Giza (EG); Mohamed M. Rehan, Cairo (EG)

(73) Assignee: INTEL CORPORATION, Santa Clara, CA (US)

(*) Notice: Subject to any disclaimer, the term of this patent is extended or adjusted under 35 U.S.C. 154(b) by 150 days.

(21) Appl. No.: 14/582,368

(22) Filed: Dec. 24, 2014

(65) Prior Publication Data

US 2016/0191258 A1   Jun. 30, 2016

(51) Int. Cl.
| | |
|---|---|
| H04L 12/18 | (2006.01) |
| H04N 21/24 | (2011.01) |
| H04N 21/44 | (2011.01) |
| H04N 21/643 | (2011.01) |
| H04L 29/06 | (2006.01) |
| H04W 72/00 | (2009.01) |
| H04W 88/02 | (2009.01) |

(52) U.S. Cl.
CPC ............ *H04L 12/189* (2013.01); *H04L 65/60* (2013.01); *H04N 21/2401* (2013.01); *H04N 21/44004* (2013.01); *H04N 21/643* (2013.01); *H04W 72/005* (2013.01); *H04W 88/02* (2013.01)

(58) Field of Classification Search
CPC .... H04L 12/189; H04L 65/60; H04W 72/005; H04W 88/02; H04N 21/643; H04N 21/44004; H04N 21/2401
See application file for complete search history.

(56) References Cited

U.S. PATENT DOCUMENTS

| | | | | |
|---|---|---|---|---|
| 2009/0290555 A1* | 11/2009 | Alpert | ............... | H04W 4/20 370/331 |
| 2011/0032832 A1* | 2/2011 | Jalali | ............... | H04L 47/10 370/252 |
| 2012/0155398 A1* | 6/2012 | Oyman | ............... | H04L 47/26 370/329 |

FOREIGN PATENT DOCUMENTS

EP         2 237 575 A1    10/2010

OTHER PUBLICATIONS

Intel: Hybrid PSS/MBMS Download Delivery of DASH-Formatted Content, 3GPP Draft; S4-120582_CR26346-0222_REL11, 3$^{rd}$ Generation Partnership Project (3GPP), Mobile Competence Centre; 650, Route Des Lucioles; F-06921 Sophia-Antipolis Cedex; France; May 15, 2012.

(Continued)

*Primary Examiner* — Jackie Zuniga Abad
(74) *Attorney, Agent, or Firm* — Thorpe North & Western

(57) ABSTRACT

Technology for receiving media content is disclosed. Media content segments can be received on a broadcast channel via a multimedia broadcast multicast service (MBMS) client in a user equipment (UE) while the MBMS client is operating in a first streaming mode. The UE can determine that a MBMS decoder buffer level and a broadcast channel condition associated with the broadcast channel do not comply with a defined threshold. The UE can switch from operating in the first streaming mode to a second streaming mode based on the MBMS decoder buffer level and the broadcast channel condition not complying with the defined threshold.

19 Claims, 10 Drawing Sheets

(56) References Cited

OTHER PUBLICATIONS

Stockhammer T: Hybrid broadcast and OTT delivery for terrestrial and mobile TV services, IBC 2014 Conference, Sep. 11-15, 2014, Amsterdam, Sep. 11, 2014.

He Jian et al: CBM: Online Strategies on Cost-Aware Buffer Management for Mobile Video Streaming, IEEE Transactions on Multimedia, IEEE Service Center, Piscataway, NJ, US; Jan. 1, 2014.

* cited by examiner

MEDIA CONTENT STREAMING

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
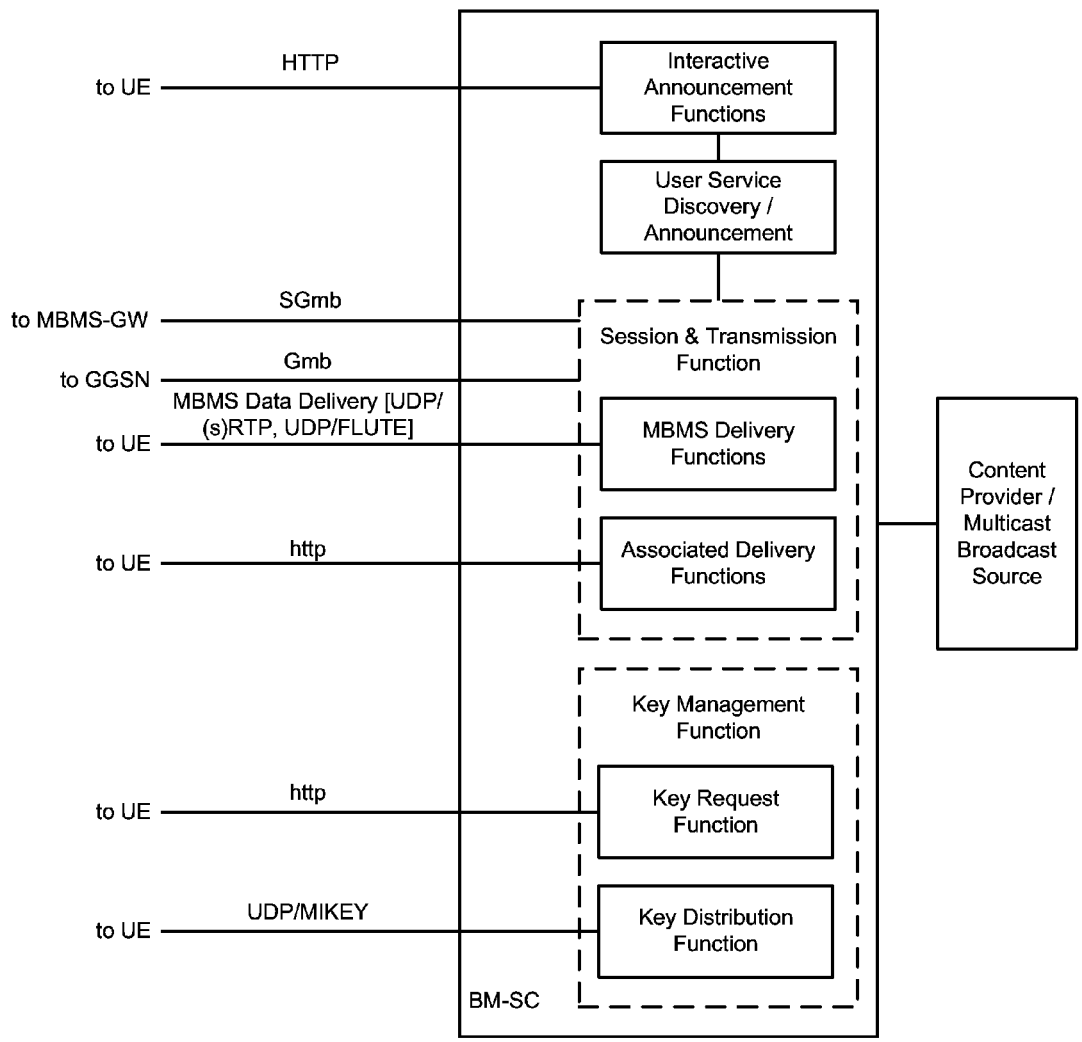
FIG. 1 illustrates a diagram of a broadcast multicast service center (BMSC) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for switching between a broadcast streaming mode and a unicast streaming mode, and vice versa, at a multimedia broadcast multicast service (MBMS) client of a user equipment (UE). The UE can receive media content segments on a broadcast channel via the MBMS client while the MBMS client is operating in the broadcast streaming mode. The UE can detect when a MBMS decoder buffer level and/or a broadcast channel condition for the broadcast channel do not comply with a defined threshold. In other words, the UE can detect when a broadcast channel quality deteriorates beyond the defined threshold. In addition, the UE can detect when certain media content segments are not properly delivered to the UE (i.e., the media content segments are missing). As a result, the UE can switch from operating in the broadcast streaming mode with the MBMS client to a unicast streaming mode. Switching from the broadcast streaming mode with relatively poor channel conditions to the unicast streaming mode can reduce rebuffering events and enhanced a user's quality of experience (QoE). The UE can remain in the unicast streaming mode until the MBMS decoder buffer level and/or the broadcast channel condition improves. In other words, the UE can switch back to the broadcast streaming mode when the MBMS decoder buffer level and/or the broadcast channel condition for the broadcast channel are compliant with the defined threshold. In addition, the UE can switch back to the broadcast streaming mode when previously missing media content segments are delivered to the UE. Switching back to the broadcast streaming mode in a minimum period of time can prevent a network from becoming overloaded due to a relatively large number of duplicate unicast packets. Therefore, the MBMS client can switch accordingly between operating in the broadcast streaming mode and the unicast streaming mode in order to optimize both network resources and user experience.

Hypertext transfer protocol (HTTP) adaptive streaming (HAS) can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

When using HAS to deliver internet multimedia content, a video client operating on a mobile device can be configured to perform the primary role in rate adaptation by choosing and requesting the appropriate video representation levels from a video server using an HTTP GET or partial GET command to retrieve data from a specified resource, such as a multimedia server. The video client initially builds up a buffer to a certain level before beginning to playback streaming multimedia content, such as audio or video. This phase is referred to as the start-up phase. After this, the client begins playback of the buffered multimedia content. The quality and resolution of the multimedia playback at the client device is dependent on the available link bandwidth. The video client typically estimates the available link bandwidth based only on higher layer throughput estimates, such as HTTP-level video streaming throughput, or on transmission control protocol (TCP) throughput.

Multimedia streaming in a high mobility environment can be challenging when fluctuations in network conditions (i.e., network variability) decreases a communication data rate associated with the multimedia content. When an overloaded network causes the communication data rate to decrease, an end user quality of experience (QoE) can decrease as well. For example, the multimedia content received at the mobile device can be of less resolution or quality and/or the multimedia content can periodically break or pause when being provided over the overloaded network.

The use of progressive download based streaming techniques in mobile networks of limited resources can be undesirable due to inefficient bandwidth utilization and poor end user quality of experience. As discussed in further detail below, hyper-text transfer protocol (HTTP) based streaming services, such as dynamic adaptive streaming over HTTP (DASH), can be used to address weaknesses of progressive download based streaming.

Multimedia content that is streamed to a client, such as a user equipment (UE), can include a plurality of multimedia content segments. The multimedia content segments can each contain different encoded versions that represent different qualities levels of the multimedia content. The different encoded versions can allow the client to seamlessly adapt to changing network conditions. For example, when the network conditions are good (i.e., the network conditions are above a predetermined threshold), the client can request multimedia content segments that are of a higher video quality. When the network conditions are poor (i.e., the network conditions are below a predetermined threshold), the client can request multimedia content segments that are of a lower video quality. As a result, the client can still be able to receive the multimedia content segments (albeit at a lower quality) when the network conditions are poor and a likelihood of the adaptive media stream being interrupted can be reduced.

In DASH, the client can select the multimedia content segments with a highest bit rate, such that the multimedia content segments can be downloaded at the client in time for media playback without causing a rebuffering event in the media playback. In other words, the client may not select multimedia content segments that are so high that the adaptive media stream is periodically interrupted in order to cache or preload a portion of the media content onto the client before resuming media playback at the client. In one example, adverse network conditions can degrade a quality of the media content stream. The adverse network conditions can include coverage nulls, abrupt bandwidth changes, packet losses, substantial delay variations, etc. Although adaptive streaming techniques can consider current network conditions when calculating an available throughput and determining an appropriate streaming bit rate based on the available throughput, smooth media playback at the client may not be guaranteed during abrupt network variations and/or adverse network conditions.

Therefore, in order to maintain a desirable quality of experience for an adaptive media stream at the client, the client's planned route and current network conditions along the planned route can be used to strategically cache the multimedia content segments at the client, thereby resulting in smoother media playback and an enhanced quality of experience at the client. The client can select a planned route (i.e., a geographical route that the client is about to embark on). The client can be streaming media content (e.g., a movie) while traveling on the planned route. In one example, the client can include a mobile device located within a moving vehicle or a computing device of the vehicle. The client can receive current network conditions for the planned route from a channel information database (CID). The current network conditions can include certain locations along the planned route (e.g., tunnels, bridges, remote areas) with corresponding network conditions that are below a predetermined threshold. The client can request additional media content segments of the media content (e.g., additional segments of the movie) from a media content server and then store the additional media content segments in the cache. When the client reaches the locations along the planned route with network conditions that are below the predetermined threshold, the client can playback media content that is stored in the cache. As a result, continuous media playback can be substantially provided at the client, even during times when current network conditions along the planned route fall below the predetermined threshold.

Wireless Multimedia Standards

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). An MTSI-based transmitter UE terminal can capture and record video, and then transfer the video to an MTSI-based receiver UE terminal over a 3GPP network. The receiver UE terminal can then decode and render the video. The 3GPP TS 26.140 also enables video sharing using multimedia sharing services (MMS), in which support for the 3GP file format is provided.

The standards described above are provided as examples of wireless multimedia standards that can be used to communicate multimedia files to, from, and/or between multimedia devices. The examples are not intended to be limiting. Additional standards can be used to provide streaming video, conversational video, or video sharing.

Enhanced Multimedia Broadcast Multicast Services (eMBMS)

The on-going commercialization of LTE networks has precipitated increasing interest in the deployment of enhanced multimedia broadcast and multicast services (eMBMS). The LTE version of Multimedia Broadcast Multicast Services (MBMS) is eMBMS. MBMS is a point-to-multipoint interface specification designed to provide efficient delivery of broadcast and multicast services. MBMS can be applicable to mobile television (TV) and radio broadcasting, as well as file delivery and emergency alerts. Since the first deployments of eMBMS are expected in 2014, it is important to enhance the performance and usability of the core MBMS user service features. MBMS, which is specified in 3GPP TS 26.346 Releases 6-12, is a point-to-multipoint system utilized on cellular networks operating in accordance with one of the cellular standards promulgated by the 3GPP. MBMS is designed for efficient delivery of popular media content to a plurality of receivers based on broadcast and multicast techniques. At the service layer, MBMS defines delivery protocols for both streaming of multimedia content and reliable download of files, based on the user datagram protocol (UDP) at the transport layer, and using real-time transmission protocol (RTP) for streaming and File Delivery over Unidirectional Transport (FLUTE) for file delivery.

An MBMS access client can receive the media data and metadata from the server, known as the broadcast multicast service center (BMSC), via user service discovery (USD) signaling. MBMS has been adopted as the evolved MBMS (eMBMS) mode in 3GPP-based Long Term Evolution (LTE) standards development corresponding to 3GPP Release 8 and onwards. The MBMS Download Delivery technique is designed to deliver an arbitrary number of objects via MBMS to a relatively large receiver population. MBMS Download defines several techniques to increase reliability such as FEC and file repair. The download delivery technique allows the delivery of DASH segments and Media Presentation Descriptions.

MBMS download delivery is an attractive service alternative for offloading HTTP-based unicast download delivery. Benefits include enabling support for new non-real-time service types, provision of contents that complement MBMS streaming services, and leveraging the increasing storage capacity on devices. The DASH segment format, although mainly intended for unicast transport with HTTP, is agnostic of the delivery environment being unicast or multicast. The MBMS User Service Specification TS 26.346 indicates the possibility for DASH-formatted content to be transmitted using MBMS download delivery with the FLUTE protocol. FLUTE, as defined in RFC3926, permits to deliver segments over MBMS such that the client observes them being delivered over HTTP/TCP. HTTP-URL is assigned to each delivered object in FLUTE and the HTTP-URL maps the Segment URLs in the MPD, i.e., the Content-Location element in the File Delivery Table (FDT) for the delivered object over FLUTE matches the Segment URL in the MPD. The UE can identify the received DASH representations based on the comparison of the HTTP URLs contained in the MPD and the URL information included in the FLUTE packets.

FIG. 1 illustrates the MBMS-based broadcast multicast service center (BMSC) sub-functional architecture and associated interfaces between the UE and BMSC. The BMSC or BM-SC can be in communication with and/or control a content provider/multicast broadcast source. The BM-SC can provide the MBMS delivery functions. The MBMS is further described in 3GPP TS 26.346.

Figure 2:
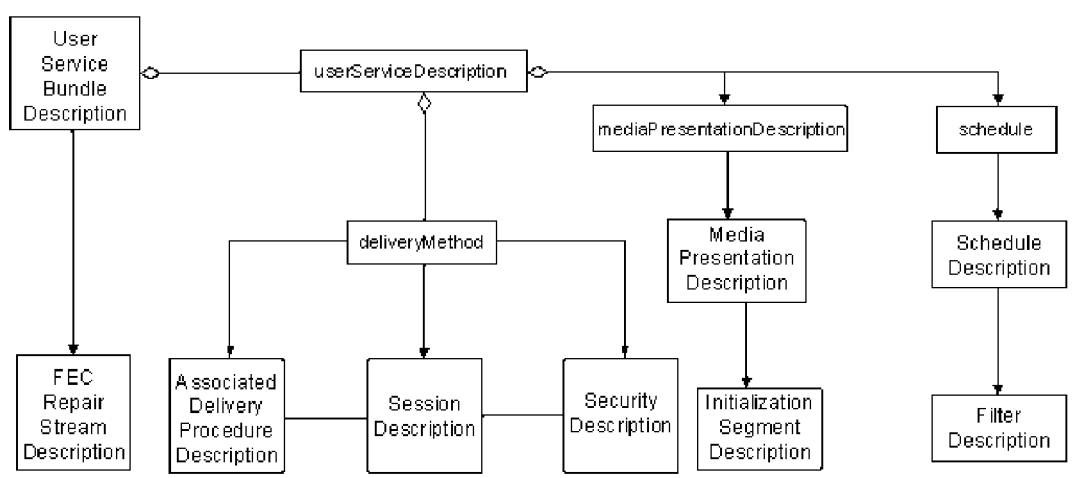
FIG. 2 illustrates a diagram of a multimedia broadcast and multicast services (MBMS) user service description (USD) in accordance with an example.

FIG. 2 illustrates a diagram of a multimedia broadcast and multicast services (MBMS) user service description (USD). The BM-SC announces available MBMS services via one or more instantiations of user service descriptions (USDs) organized as a service bundle. The MBMS User Services are described by metadata (objects/files) delivered using the download delivery method or using interactive announcement functions. MBMS User Service Discovery or Announcement involves the delivery of fragments of metadata to a plurality of receivers in a suitable manner. The metadata itself describes details of services. Metadata management information consists of metadata envelope object(s) (in XML format) allowing the identification, versioning, update and temporal validity of metadata fragment objects.

As shown in FIG. 2, the metadata included in the USD that are provided to the receivers can include: a metadata fragment object describing details of a single or a bundle of MBMS user services, a metadata fragment object(s) describing details of MBMS user service sessions, a metadata fragment object(s) describing details of Associated delivery methods, a metadata fragment object(s) describing details of service protection, a metadata fragment object describing details of the FEC repair data stream, a metadata fragment object providing a Media Presentation Description (for DASH content), a metadata fragment object(s) providing Initialization Segments (for DASH content), a metadata fragment object(s) providing a Schedule information description, a metadata fragment objects(s) providing filtering data for an MBMS User Service within a service bundle at the level of individual sessions of a given user service or individual file contents within a user service.

MBMS can provide efficient delivery of broadcast and multicast services, which enables network resources (e.g., core network resources or radio network resources) to be shared among a group of users that request the same media content. The MBMS service uses a streaming delivery technique in order to provide continuous transmissions, such as mobile television services. However, MBMS transmissions differ from point-to-point unicast transmissions, in that unicast transmissions include an ability to retransmit data that was not properly received. For example, for unicast transmissions, an automatic repeat request (ARQ) is used to verify that each packet is successfully received at the UE.

The UE can send an acknowledgement (ACK) after each packet is successfully received at the UE. If a packet is not received, the UE can send a negative ACK (NACK), and the packet can be retransmitted to the UE. As a result, unicast transmissions are relatively reliable. In contrast, MBMS transmissions generally do not allow received packets to be acknowledged. In addition, MBMS transmissions generally do not support resending packets if needed (i.e., if the packets were not successfully received). Application Layer Forward Error Correction (AL-FEC) is used in MBMS in order to increase the transmission reliability depending on a user channel. However, if the AL-FEC fails to recover a received source block or media content segment (which can include several frames), the MBMS client in the UE cannot request a retransmission of the last source block or media content segment. If the MBMS client's channel condition is relatively poor, the MBMS client may be unable to receive the MBMS stream. Therefore, as described in further detail below, the MBMS client can temporarily switch a broadcast session to a unicast session, based on the channel condition, in order to increase reliability and a user level of satisfaction.

Figure 3:
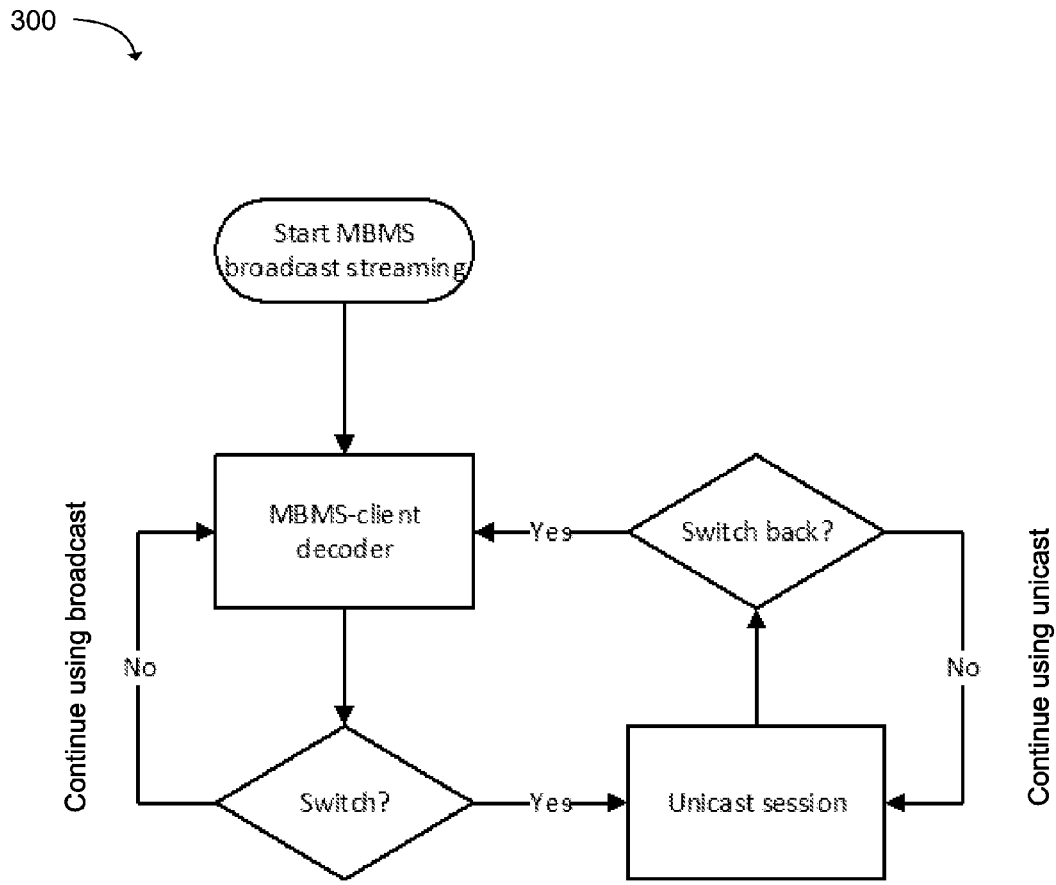
FIG. 3 is a flowchart illustrating a multimedia broadcast multicast service (MBMS) client in a user equipment (UE) switching between a broadcast streaming mode and a unicast streaming mode in accordance with an example.

FIG. 3 is an exemplary flowchart illustrating a multimedia broadcast multicast service (MBMS) client in a user equipment (UE) switching between a broadcast streaming mode and a unicast streaming mode. The MBMS client can begin operating in the broadcast streaming mode. The MBMS client can receive media content packets over a broadcast channel while operating in the broadcast streaming mode. The MBMS client can detect when an MBMS decoder in the MBMS client fails to operate correctly. In addition, the MBMS client can detect when an MBMS decoder buffer level at the UE drops below a defined threshold (which can result in buffering events at the MBMS client). In one example, the MBMS decoder buffer level can drop below the defined threshold when a broadcast channel condition associated with the broadcast channel deteriorates, e.g., drops below the defined threshold. In another example, the MBMS client can detect when media content segments are not properly received at the MBMS client or some of the media content segments are missing. In at least one of the situations described above, the MBMS client can temporarily switch from operating in the broadcast streaming mode to the unicast streaming mode.

The MBMS client can operate in the unicast streaming mode until the MBMS decoder buffer level and/or the broadcast channel condition is above the defined threshold. In other words, the MBMS client can continue operating in the unicast streaming mode until the broadcast channel improves to a defined level. In addition, the MBMS client can detect when previously missing media content segments are received at the MBMS client. At this point, the MBMS client can switch back to the broadcast streaming mode. In other words, during the unicast streaming mode, the MBMS client can switch back to the broadcast streaming mode when the MBMS decoder buffer level and/or the broadcast channel condition has reached the defined threshold. The MBMS client may similarly switch back to the unicast streaming mode as described earlier.

By allowing the MBMS client to switch accordingly between the broadcast streaming mode and the unicast streaming mode, based on network channel conditions, the client's quality of experience can be improved and the client's buffering time can be minimized. When the MBMS decoder buffer level and/or the broadcast channel condition are above the defined threshold, the MBMS client generally operates in the broadcast streaming mode as default in order to conserve network resources. The utilization of network resources can be optimized by minimizing an amount of time that the MBMS client operates in the unicast streaming mode. However, the MBMS client is allowed to operate in the unicast streaming mode for periods of time (i.e., based on relatively poor network conditions) in order to increase broadcast quality and user satisfaction. Although MBMS is described as an example technology that can be used to implement a switching technique between broadcast and unicast, the technology described herein can be applied to other similar protocols that support both broadcast and unicast streaming.

Figure 4:
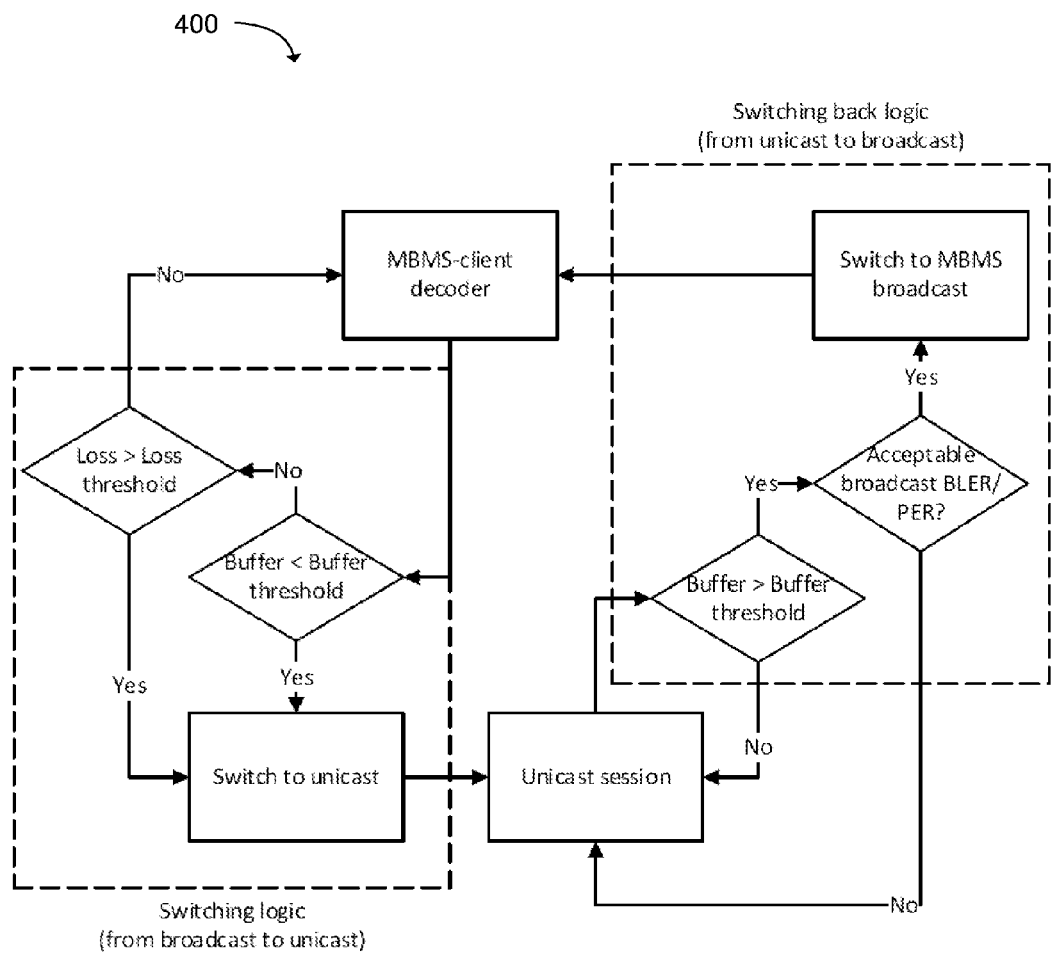
FIG. 4 is a flowchart illustrating a multimedia broadcast multicast service (MBMS) client in a user equipment (UE) switching between a broadcast streaming mode and a unicast streaming mode in accordance with an example.

FIG. 4 is an exemplary flowchart illustrating a multimedia broadcast multicast service (MBMS) client in a user equipment (UE) switching between a broadcast streaming mode and a unicast streaming mode. The MBMS client can begin operating in the broadcast streaming mode. The MBMS client can receive media content packets over a broadcast channel while operating in the broadcast streaming mode. The MBMS client can determine whether an MBMS decoder buffer level is below a defined threshold. If the MBMS decoder buffer level is below the defined threshold, then the MBMS client can switch from the broadcast streaming mode to the unicast streaming mode. If the MBMS decoder buffer level is not below the defined threshold, then the MBMS client can determine whether a number of lost media content packets (or missing media content packets) is greater than a defined threshold. In other words, the MBMS client can determine whether the number of media content packets that were not successfully delivered to the MBMS client greater than the defined threshold. The defined threshold can be a specific number of lost video frames. Alternatively, the defined threshold can be dynamically set based on a size of the last source blocks received at the MBMS client. If the number of lost media content packets is less than the defined threshold, then the MBMS client can continue operating in the broadcast streaming mode. If the number of lost media content packets is greater than the defined threshold, then the MBMS client can switch from the broadcast streaming mode to the unicast streaming mode.

While operating in the unicast streaming mode, video frames from both the MBMS decoder buffer and a unicast buffer can be combined in a higher level buffer and then played at the MBMS client. In addition, while operating in the unicast streaming mode, the MBMS client can determine whether the MBMS decoder buffer level is above the defined threshold. The defined threshold can be a static level or a dynamic level. If the MBMS decoder buffer level is below the defined threshold, then the MBMS client can continue operating in the unicast streaming mode. If the MBMS decoder buffer level is above the defined threshold, then the MBMS client can determine whether a block error rate (BLER) or a packet error rate (PER) complies with a defined threshold. The BLER can indicate the number of errors per a defined number of source blocks and the PER can indicate the number of errors per a defined number of packets. If the BLER and/or the PER does not meet the defined threshold, then the MBMS client can continue operating in the unicast streaming mode. If the BLER and/or the PER do meet the defined threshold, then the MBMS client can switch back to the broadcast streaming mode. By observing the BLER and the PER, the MBMS client can avoid unnecessarily decoding the incoming source blocks while operating in the unicast streaming mode. The MBMS client may similarly switch back to the unicast streaming mode while operating in the broadcast streaming mode as described earlier.

In one example, the MBMS client can briefly switch to the unicast streaming mode when a broadcast channel condition is relatively poor, and then later switch back to the broadcast streaming mode when the broadcast channel condition improves based on the BLER and the PER, the MBMS client receives previously missing data packets and/or the MBMS buffer is refilled to a defined level of data packets. The MBMS buffer can be refilled to the defined level, such that the MBMS client can switch back to the broadcast streaming mode substantially without potential rebuffering conditions. A combination of the above metrics can be used when switching between the broadcast streaming mode and the unicast streaming mode, and vice versa.

Figure 5:
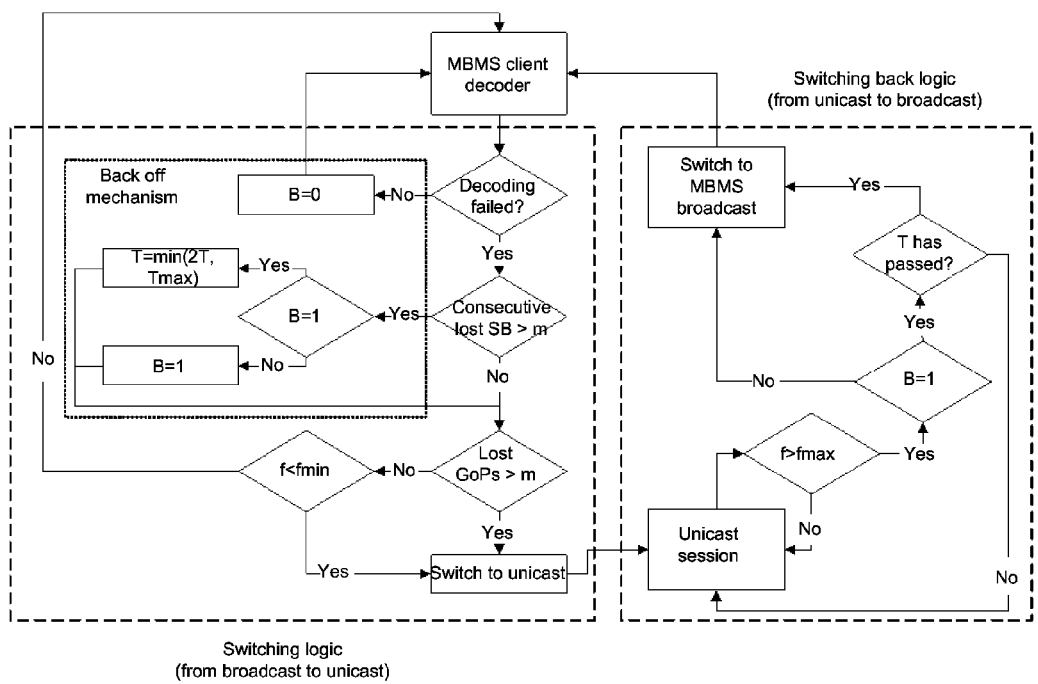
FIG. 5 is a flowchart illustrating a multimedia broadcast multicast service (MBMS) client in a user equipment (UE) switching between a broadcast streaming mode and a unicast streaming mode in accordance with an example.

FIG. 5 is an exemplary flowchart illustrating a multimedia broadcast multicast service (MBMS) client in a user equipment (UE) switching between a broadcast streaming mode and a unicast streaming mode. The MBMS client can begin operating in the broadcast streaming mode. The MBMS client can receive media content packets over a broadcast channel while operating in the broadcast streaming mode. The MBMS client can determine whether an MBMS decoder has failed. If the MBMS decoder has not failed, then a back off flag B can be set to 0 and the MBMS client can continue operating in the broadcast streaming mode. If the MBMS decoder has failed, the MBMS client can determine whether the number of consecutive lost source blocks at the MBMS client is greater than a defined integer m. If the number of consecutive lost source blocks is greater than the defined integer m, then the back off flag B can be set to 1. A back off time T can be a minimum of 2T and $T_{MAX}$, wherein $T_{MAX}$ is a predefined value. The back off time T can be set to 2T (as long as 2T is less than $T_{MAX}$) when m consecutive source blocks are lost on multiple occasions, as discussed in further detail below. If this is not the case, then the back off time T can be set to $T_{MAX}$.

Based on whether the number of consecutive lost source blocks is greater than the defined integer m or less than the defined integer m, the MBMS client can thereafter determine whether the number of lost group of pictures (GoPs) is greater than the defined integer m. The group of pictures can specify an order in which intra-frames and inter-frames are arranged. The group of pictures can be a group of successive pictures within a coded video stream. In one example, the GoPs can be lost when corresponding source blocks are lost. If the number of lost GoPs is greater than the defined integer m, then the MBMS client can switch to the unicast streaming mode. If the number of lost GoPs is not greater than the defined integer m, then the MBMS client can determine whether the number of buffered frames (f) in an MBMS decoder buffer is less than a defined threshold ($f_{MIN}$). If the number of buffered frames in the MBMS decoder is greater than the defined threshold ($f_{MIN}$), then the MBMS client can continue operating in the broadcast streaming mode. If the number of buffered frames in the MBMS decoder is less than the defined threshold ($f_{MIN}$), then the MBMS client can switch to the unicast streaming mode.

In one example, the MBMS client can switch to the unicast streaming mode based on a combination of a weighted source block sliding window and the MBMS client's MBMS decoder buffer level. The weighted source block sliding window can monitor the last n received source blocks. For example, each source block entry in a time window can be weighed by the number of group of pictures (GoPs) contained within that source block. The sliding window can be reset each time the MBMS client switches back to the broadcast streaming mode. The use of the sliding window can reduce switching sensitivity and allow for switching when actual network conditions change, rather than switching due to sporadic changes that can be misleading. When the number of lost GoPs is relatively high with respect to the source blocks, the network conditions can be assumed to be unfavorable. When the number of lost GoPs is relatively low with respect to the source blocks, the network conditions can be assumed to be favorable.

The MBMS client can monitor the number of frames (f) in the MBMS decoder buffer. When a source block is lost, the MBMS client can switch to the unicast streaming mode if losing the source block caused losing a total of m GoPs in the sliding window, wherein m is a defined integer. In addition, the MBMS client can switch to the unicast streaming mode if the number of frames (f) in the MBMS decoder buffer were less than a certain threshold ($f_{MIN}$), wherein $f_{MIN}$ can be a predefined value or a dynamic value based on a size of the source blocks. Therefore, the MBMS client can switch to the uncast streaming mode based on the weighted source block sliding window and/or the MBMS client's MBMS decoder buffer level.

Referring back to FIG. 5, the MBMS client can operate in the unicast streaming mode. While in the unicast streaming mode, the MBMS client can monitor the number of frames (f) in the MBMS decoder buffer. The number of frames in the MBMS decoder buffer can be compared to a defined threshold ($f_{MAX}$), wherein $f_{MAX}$ is a defined number of subframes that is set based on the number of GoPs in the last received broadcast source block. If the number of frames in the MBMS decoder buffer is greater than the defined threshold, then the MBMS client remains in the unicast streaming mode. If the number of frames in the MBMS decoder buffer is less than (i.e., not greater than) the defined threshold, then the MBMS client can determine whether the back off flag B is set to 1. As previously discussed, while operating in the broadcast streaming mode, the MBMS client can set the back off flag B to 1 when m consecutive source blocks were lost, wherein m is a defined integer. In other words, a back off mechanism is initiated during the broadcast streaming mode by setting a back off flag B if m consecutive source blocks were lost. As a result, while operating in the uncast streaming mode, the MBMS client can determine whether B=1. If B does not equal 1, then the MBMS client can switch back to the broadcast streaming mode. If B=1, then the MBMS client can determine whether the back off time T has passed. As previously explained, the back off time T may be calculated when the MBMS client was operating in the broadcast streaming mode. For example, the back off time can be set to $T_{MAX}$, wherein $T_{MAX}$ is a predefined value.

Therefore, when the MBMS client is operating in the unicast streaming mode, the MBMS client does not switch back to the broadcast streaming mode (even if $f > f_{MAX}$) until the back off time T has passed or expired. The MBMS client can switch back to the broadcast streaming mode when there is no back off time (i.e., the back off time has expired), provided that the buffered unicast subframes exceed $f_{MAX}$. If the back off time T has not passed, then the MBMS client can resume operating in the unicast streaming mode. If the MBMS client returns back to the broadcast streaming mode and another m consecutive source blocks are lost, the back off time T can be doubled (i.e., 2T). However, the updated back off time cannot exceed a maximum back off time limit $T_{MAX}$, which is a predefined value.

Figure 6:
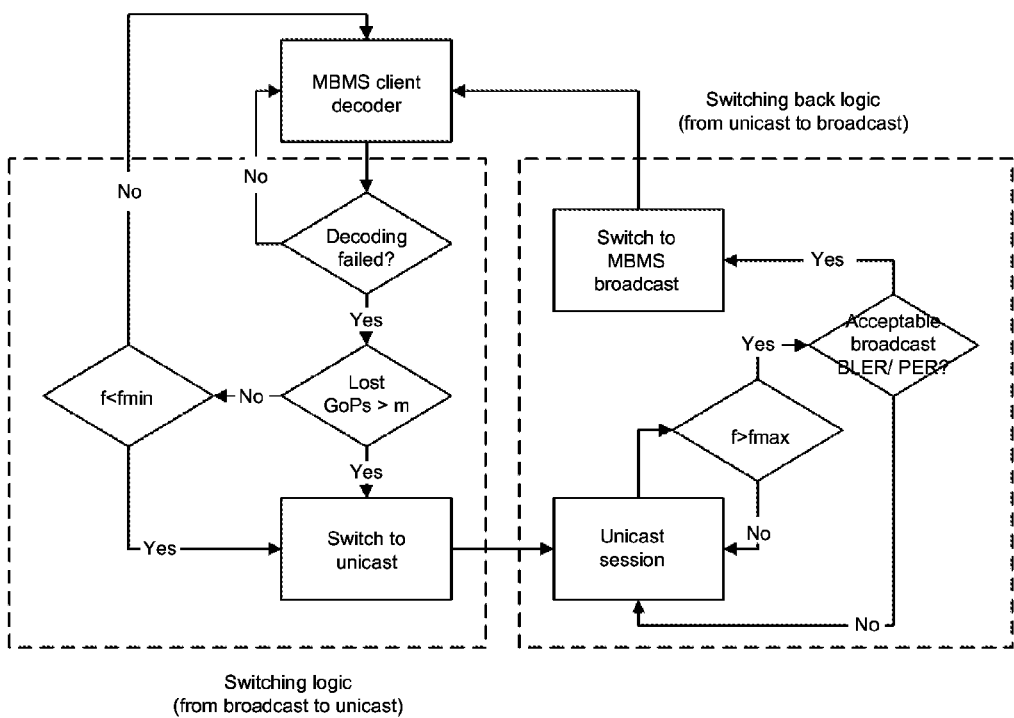
FIG. 6 is a flowchart illustrating a multimedia broadcast multicast service (MBMS) client in a user equipment (UE) switching between a broadcast streaming mode and a unicast streaming mode in accordance with an example.

FIG. 6 is an exemplary flowchart illustrating a multimedia broadcast multicast service (MBMS) client in a user equipment (UE) switching between a broadcast streaming mode and a unicast streaming mode. The MBMS client can begin operating in the broadcast streaming mode. The MBMS client can receive media content packets over a broadcast channel while operating in the broadcast streaming mode.

The MBMS client can determine whether an MBMS decoder has failed, and if not, the MBMS client can remain operating in the broadcast streaming mode. If the MBMS decoder has failed, the MBMS client can determine whether a number of lost group of pictures (GoPs) is greater than a defined value m. If the number of lost GoPs is less than (i.e., not greater than) the defined value m, then the MBMS client can determine whether a number of frames (f) in an MBMS decoder buffer is less than a defined threshold. If the number of frames in the MBMS decoder buffer is not less than the defined threshold, then the MBMS client can remain operating in the broadcast streaming mode. If the number of frames in the MBMS decoder buffer is less than the defined threshold and/or the number of lost GoPs is less than m, then the MBMS client can switch to the unicast streaming mode.

While operating in the unicast streaming mode, the MBMS client can determine whether the number of frames (f) in the MBMS decoder buffer is greater than a defined value ($f_{MAX}$), and if not, the MBMS client can remain operating in the unicast streaming mode. If the number of frames in the MBMS decoder is greater than the defined value, then the MBMS client can determine whether a block error rate (BLER) or a packet error rate (PER) complies with a defined threshold. The BLER can indicate the number of errors per a defined number of source blocks and the PER can indicate the number of errors per a defined number of packets. If the BLER and/or the PER does not meet the defined threshold, then the MBMS client can continue operating in the unicast streaming mode. If the BLER and/or the PER do meet the defined threshold, then the MBMS client can switch back to the broadcast streaming mode. Thus, the MBMS client can switch back to the broadcast streaming mode when the buffered unicast frames exceed $f_{MAX}$, provided that the PER/BLER is also lower than a specified value.

By observing the BLER and the PER, the MBMS client can avoid unnecessarily decoding the incoming source blocks while operating in the unicast streaming mode. In other words, the MBMS client can be inactive while operating in the unicast streaming mode, thereby saving computational power. In the example shown in FIG. 6, a sliding PER/BLER window can be used in the unicast streaming mode to monitor the states of the last n packets/source blocks in the broadcast channel. The MBMS client can similarly switch back to the unicast streaming mode while operating in the broadcast streaming mode as described earlier. In an alternative configuration, the size n of the sliding PER/BLER window can be based on the number of packets/blocks that formed the last received source-block in broadcast streaming mode, rather than being a fixed number.

Figure 7:
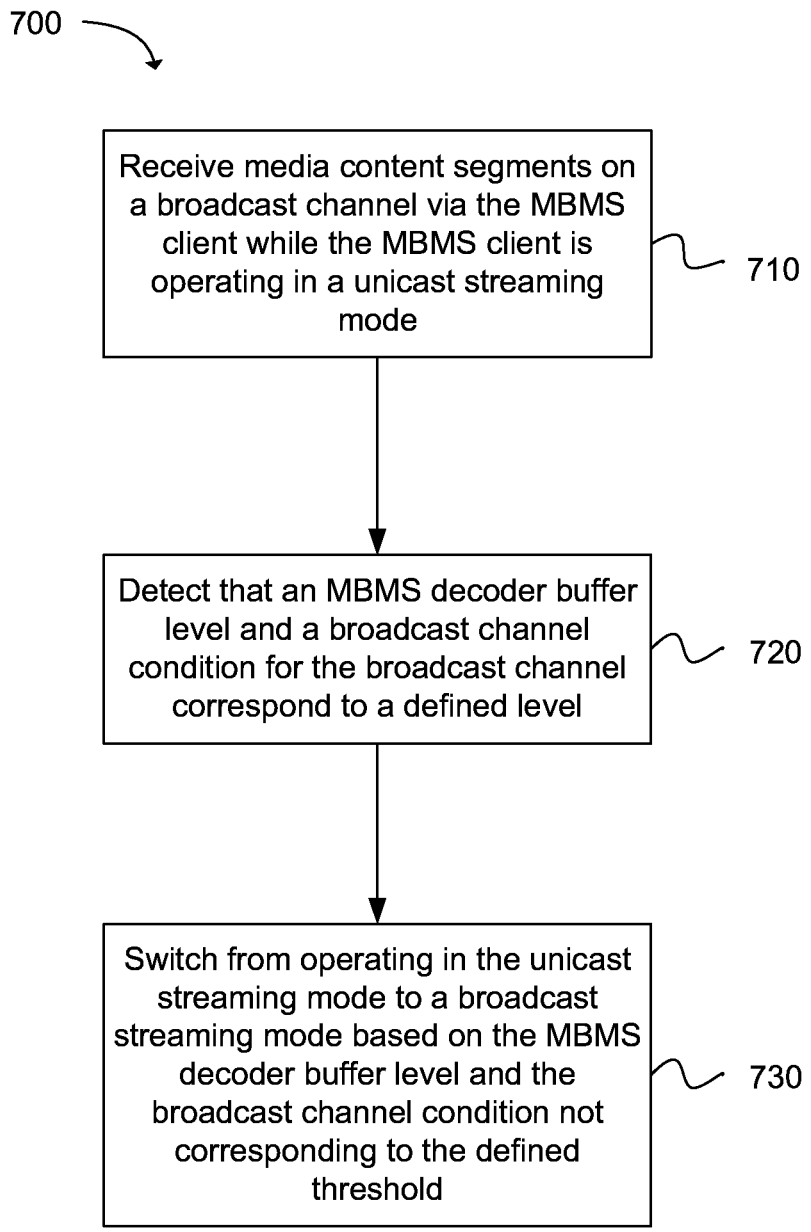
FIG. 7 depicts functionality of circuitry of a user equipment (UE) including a multimedia broadcast multicast service (MBMS) client operable to receive media content in accordance with an example.

Another example provides functionality 700 of circuitry of a user equipment (UE) including a multimedia broadcast multicast service (MBMS) client operable to receive media content, as shown in the flow chart in FIG. 7. The functionality can be implemented as a method or the functionality can be executed as instructions on a machine, where the instructions are included on at least one computer readable medium or one non-transitory machine readable storage medium. The circuitry can be configured to receive media content segments on a broadcast channel via the MBMS client while the MBMS client is operating in a unicast streaming mode, as in block 710. The circuitry can be configured to detect that an MBMS decoder buffer level and a broadcast channel condition for the broadcast channel correspond to a defined level, as in block 720. The circuitry can be configured to switch from operating in the unicast streaming mode to a broadcast streaming mode based on the MBMS decoder buffer level and the broadcast channel condition not corresponding to the defined threshold, as in block 730.

In one example, the circuitry can be further configured to receive the media content segments in the broadcast streaming mode with the MBMS client upon switching to the broadcast streaming mode from the unicast streaming mode. In another example, the circuitry can be further configured to detect that the MBMS decoder buffer level is above a defined threshold for a defined period of time, wherein the defined threshold is set according to a number of group-of-pictures (GoPs) in a last received broadcast source block at the MBMS client.

In one example, the circuitry can be further configured to detect that the broadcast channel condition for the broadcast channel is below a defined threshold based on a function of a packet error rate (PER) and a block error rate (BLER) with respect to the broadcast channel condition, wherein the defined threshold is set according to the function of the PER and the BLER with respect to a last received broadcast source-block at the MBMS client. In another example, the circuitry can be further configured to switch from operating in the unicast streaming mode to the broadcast streaming mode when previously missing media content segments are received at the MBMS client when operating in the unicast streaming mode. In addition, the UE includes an antenna, a touch sensitive display screen, a speaker, a microphone, a graphics processor, an application processor, an internal memory, or a non-volatile memory port.

Figure 8:
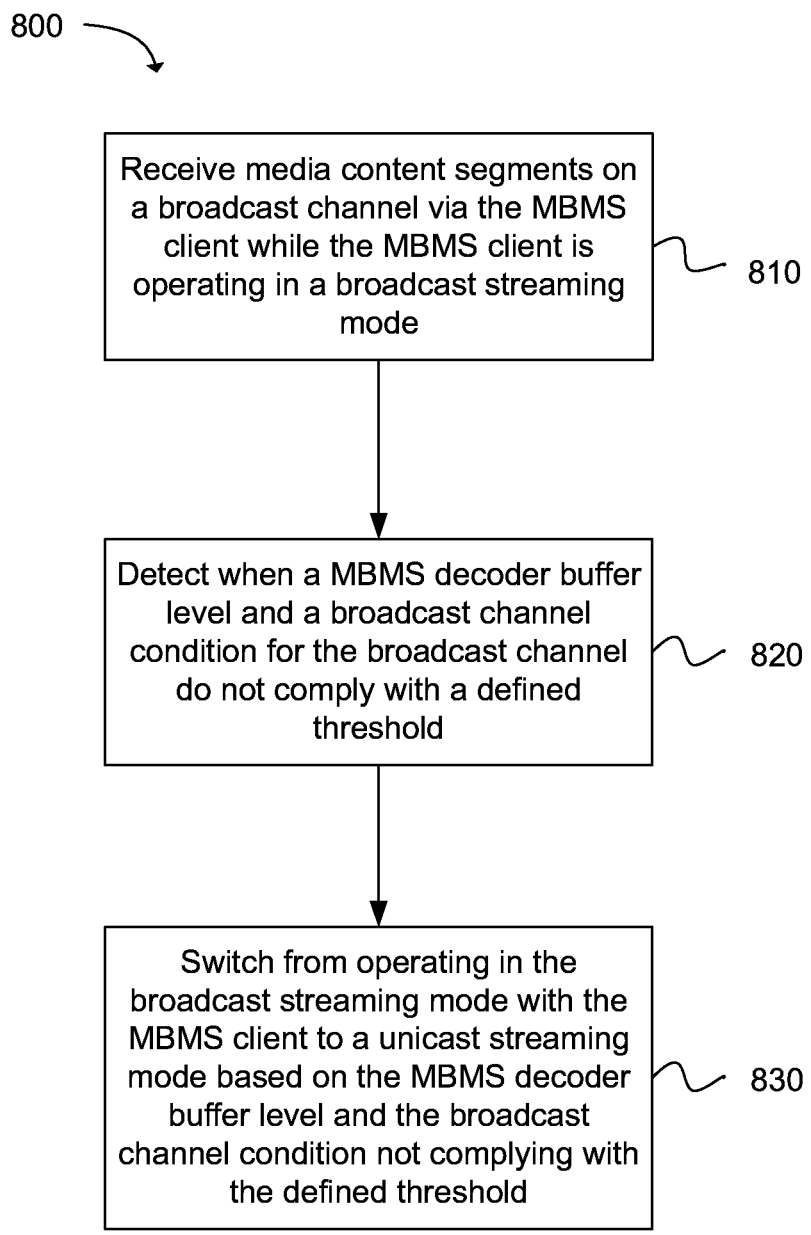
FIG. 8 depicts functionality of circuitry of a user equipment (UE) including a multimedia broadcast multicast service (MBMS) client operable to receive media content in accordance with an example.

Another example provides functionality 800 of circuitry of a user equipment (UE) including a multimedia broadcast multicast service (MBMS) client operable to receive media content, as shown in the flow chart in FIG. 8. The functionality can be implemented as a method or the functionality can be executed as instructions on a machine, where the instructions are included on at least one computer readable medium or one non-transitory machine readable storage medium. The circuitry can be configured to receive media content segments on a broadcast channel via the MBMS client while the MBMS client is operating in a broadcast streaming mode, as in block 810. The circuitry can be configured to detect when a MBMS decoder buffer level and a broadcast channel condition for the broadcast channel do not comply with a defined threshold, as in block 820. The circuitry can be configured to switch from operating in the broadcast streaming mode with the MBMS client to a unicast streaming mode based on the MBMS decoder buffer level and the broadcast channel condition not complying with the defined threshold, as in block 830.

In one example, the circuitry can be further configured to: detect when the MBMS decoder buffer level and the broadcast channel condition do comply with the defined threshold; and switch from operating in the unicast streaming mode back to the broadcast streaming mode with the MBMS client. In another example, the circuitry can be further configured to: detect when the MBMS decoder buffer level is below the defined threshold, wherein the defined threshold is a fixed value or is a dynamic value based on a size of source blocks received at the MBMS client when operating in the broadcast streaming mode; and switch from operating in the broadcast streaming mode with the MBMS client to the unicast streaming mode.

In one example, the circuitry can be further configured to: determine the broadcast channel condition for the broadcast channel based on a weighting of source blocks received at the MBMS client in a defined window with respect to a number of group-of-pictures (GoPs) contained within the source blocks; determine that the weighting of the source blocks with respect to the number of GoPs contained within the source blocks does not comply with the defined threshold; and switch from operating in the broadcast streaming mode with the MBMS client to the unicast streaming mode.

In one example, the circuitry can be further configured to: determine the broadcast channel condition for the broadcast channel based on a function of a packet error rate (PER) and a block error rate (BLER) with respect to the broadcast channel condition; determine that the function of the PER and the BLER with respect to the broadcast channel condition does not comply with the defined threshold; and switch from operating in the broadcast streaming mode with the MBMS client to the unicast streaming mode.

Figure 9:
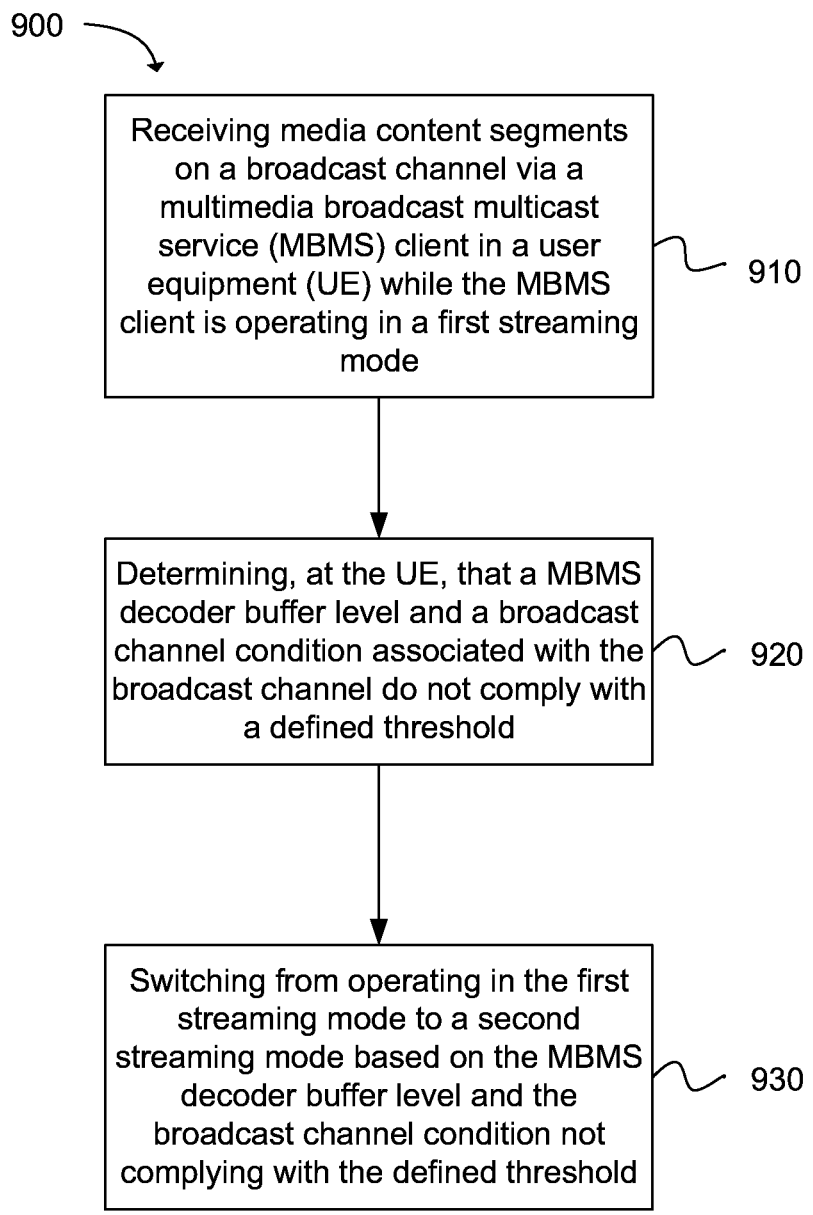
FIG. 9 depicts a flow chart of a method for receiving media content in accordance with an example.

In one example, the circuitry can be further configured to switch from operating in the broadcast streaming mode with the MBMS client to the unicast streaming mode when a decoder malfunctions at the MBMS client. In another example, the circuitry can be further configured to: switch from operating in the broadcast streaming mode with the MBMS client to the unicast streaming mode when certain media content segments are not successfully received in the broadcasting streaming mode; and switch from operating in the unicast streaming mode back to the broadcast streaming mode when previously missing media content segments are received at the MBMS client when operating in the unicast streaming mode Another example provides a method 900 for receiving media content, as shown in the flow chart in FIG. 9. The method can be executed as instructions on a machine, where the instructions are included on at least one computer readable medium or one non-transitory machine readable storage medium. The method can include the operation of receiving media content segments on a broadcast channel via a multimedia broadcast multicast service (MBMS) client in a user equipment (UE) while the MBMS client is operating in a first streaming mode, as in block 810. The method can include the operation of determining, at the UE, that a MBMS decoder buffer level and a broadcast channel condition associated with the broadcast channel do not comply with a defined threshold, as in block 820. The method can include the operation of switching from operating in the first streaming mode to a second streaming mode based on the MBMS decoder buffer level and the broadcast channel condition not complying with the defined threshold, as in block 830.

In one example, the method can include the operation of receiving the media content segments in the second streaming mode for a defined duration. In another example, the first streaming mode is a broadcast streaming mode and the second streaming mode is a unicast streaming mode. In yet another example, the first streaming mode is a unicast streaming mode and the second streaming mode is a broadcast streaming mode.

In one example, the method can include the operation of switching from operating in the first streaming mode to the second streaming mode based on a weighting of source blocks received at the MBMS client in a defined window with respect to a number of group-of-pictures (GoPs) contained within the source blocks. In another example, the method can include the operation of switching from operating in the first streaming mode to the second streaming mode based on a function of a packet error rate (PER) and a block error rate (BLER) with respect to the broadcast channel condition. In yet another example, the method can include the operation of switching from operating in the first streaming mode to the second streaming mode when the media content segments are lost or when missing media content segments are recovered.

Figure 10:
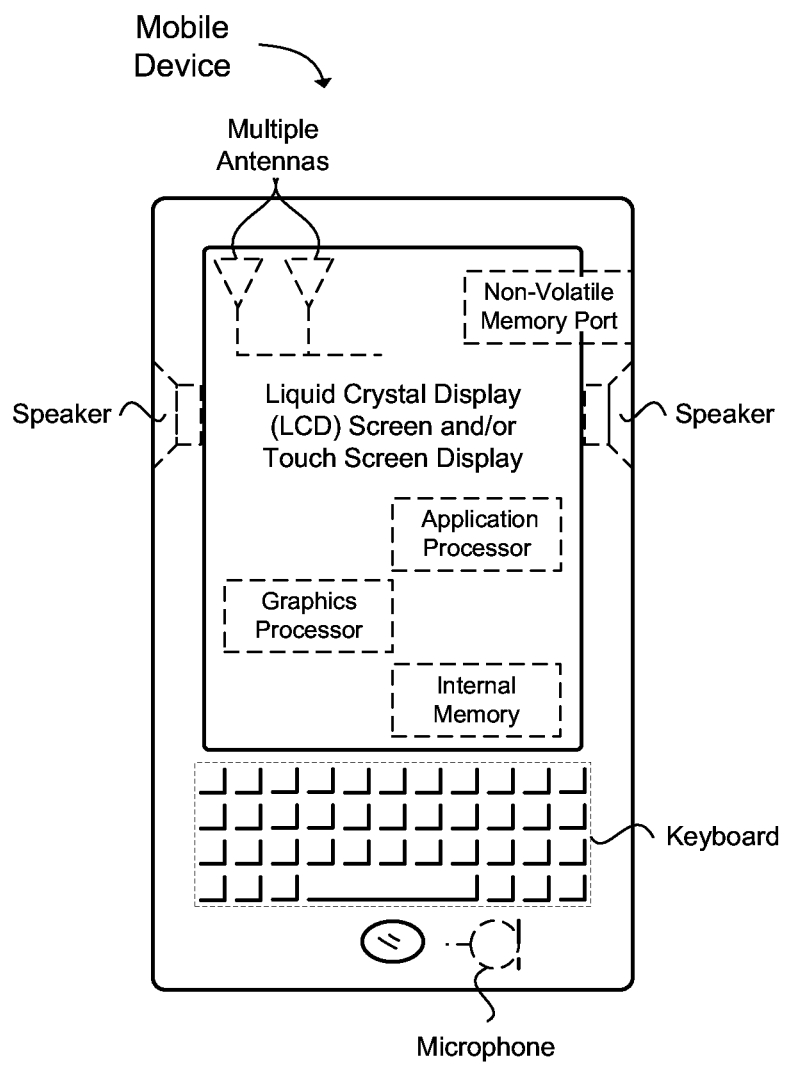
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) including a multimedia broadcast multicast service (MBMS) client operable to receive media content, the UE comprising:
   first circuitry configured to:
      receive media content segments on a broadcast channel via the MBMS client while the MBMS client is operating in a unicast streaming mode; and
   second circuitry configured to:
      detect that an MBMS decoder buffer level and a broadcast channel condition for the broadcast channel comply with a defined threshold, wherein the defined threshold is set according to a number of group-of-pictures (GoPs) in a last received broadcast source block at the MBMS client; and
      switch from operating in the unicast streaming mode to a broadcast streaming mode based on the MBMS decoder buffer level and the broadcast channel condition comply with the defined threshold.

2. The UE of claim 1, wherein the first circuitry is further configured to receive the media content segments in the broadcast streaming mode with the MBMS client upon switching to the broadcast streaming mode from the unicast streaming mode.

3. The UE of claim 1, wherein the second circuitry is further configured to detect that the broadcast channel condition for the broadcast channel is below a defined threshold based on a function of a packet error rate (PER) and a block error rate (BLER) with respect to the broadcast channel condition, wherein the defined threshold is set according to the function of the PER and the BLER with respect to a last received broadcast source-block at the MBMS client.

4. The UE of claim 1, wherein the second circuitry is further configured to switch from operating in the unicast streaming mode to the broadcast streaming mode when previously missing media content segments are received at the MBMS client when operating in the unicast streaming mode.

5. The UE of claim 1, wherein the UE includes an antenna, a touch sensitive display screen, a speaker, a microphone, a graphics processor, an application processor, an internal memory, or a non-volatile memory port.

6. A user equipment (UE) including a multimedia broadcast multicast service (MBMS) client operable to receive media content, the UE comprising:
   first circuitry configured to:
      receive media content segments on a broadcast channel via the MBMS client while the MBMS client is operating in a broadcast streaming mode; and
   second circuitry configured to:
      detect when a MBMS decoder buffer level and a broadcast channel condition for the broadcast channel do not comply with a defined threshold, wherein the defined threshold is set according to a number of group-of-pictures (GoPs) in a last received broadcast source block at the MBMS client; and
      switch from operating in the broadcast streaming mode with the MBMS client to a unicast streaming mode based on the MBMS decoder buffer level and the broadcast channel condition not complying with the defined threshold.

7. The UE of claim 6, wherein the second circuitry is further configured to:
   detect when the MBMS decoder buffer level and the broadcast channel condition do comply with the defined threshold; and
   switch from operating in the unicast streaming mode back to the broadcast streaming mode with the MBMS client.

8. The UE of claim 6, wherein the second circuitry is further configured to:
   detect when the MBMS decoder buffer level is below the defined threshold, wherein the defined threshold is a fixed value or is a dynamic value based on a size of source blocks received at the MBMS client when operating in the broadcast streaming mode; and
   switch from operating in the broadcast streaming mode with the MBMS client to the unicast streaming mode.

9. The UE of claim 6, wherein the second circuitry is further configured to:
   determine the broadcast channel condition for the broadcast channel based on a weighting of source blocks received at the MBMS client in a defined window with respect to a number of group-of-pictures GoPs contained within the source blocks;
   determine that the weighting of the source blocks with respect to the number of GoPs contained within the source blocks does not comply with the defined threshold; and
   switch from operating in the broadcast streaming mode with the MBMS client to the unicast streaming mode.

10. The UE of claim 6, wherein the second circuitry is further configured to:
   determine the broadcast channel condition for the broadcast channel based on a function of a packet error rate (PER) and a block error rate (BLER) with respect to the broadcast channel condition;
   determine that the function of the PER and the BLER with respect to the broadcast channel condition does not comply with the defined threshold; and
   switch from operating in the broadcast streaming mode with the MBMS client to the unicast streaming mode.

11. The UE of claim 6, wherein the second circuitry is further configured to switch from operating in the broadcast streaming mode with the MBMS client to the unicast streaming mode when a decoder malfunctions at the MBMS client.

12. The UE of claim 6, wherein the second circuitry is further configured to:
   switch from operating in the broadcast streaming mode with the MBMS client to the unicast streaming mode when certain media content segments are not successfully received in the broadcasting streaming mode; and
   switch from operating in the unicast streaming mode back to the broadcast streaming mode when previously missing media content segments are received at the MBMS client when operating in the unicast streaming mode.

13. At least one non-transitory machine readable storage medium having instructions embodied thereon for receiving media content at a user equipment (UE), the instructions when executed by one or more processors cause the UE to perform the following:
   receiving media content segments on a broadcast channel via a multimedia broadcast multicast service (MBMS) client in the UE while the MBMS client is operating in a first streaming mode, using one or more processors of the UE;
   determining, at the UE, that a MBMS decoder buffer level and a broadcast channel condition associated with the broadcast channel do not comply with a defined threshold, wherein the defined threshold is set according to a number of group-of-pictures (GoPs) in a last received broadcast source block at the MBMS client, using the one or more processors of the UE; and
   switching from operating in the first streaming mode to a second streaming mode based on the MBMS decoder buffer level and the broadcast channel condition not complying with the defined threshold, using the one or more processors of the UE.

14. The at least one non-transitory machine readable storage medium of claim 13, further comprising instructions which when executed by the one or more processors cause the UE to perform the following: receiving the media content segments in the second streaming mode for a defined duration.

15. The at least one non-transitory machine readable storage medium of claim 13, wherein the first streaming mode is a broadcast streaming mode and the second streaming mode is a unicast streaming mode.

16. The at least one non-transitory machine readable storage medium of claim 13, wherein the first streaming mode is a unicast streaming mode and the second streaming mode is a broadcast streaming mode.

17. The at least one non-transitory machine readable storage medium of claim 13, further comprising instructions which when executed by the one or more processors cause the UE to perform the following: switching from operating in the first streaming mode to the second streaming mode based on a weighting of source blocks received at the MBMS client in a defined window with respect to a number of GoPs contained within the source blocks.

18. The at least one non-transitory machine readable storage medium of claim 13, further comprising instructions which when executed by the one or more processors cause the UE to perform the following: switching from operating in the first streaming mode to the second streaming mode based on a function of a packet error rate (PER) and a block error rate (BLER) with respect to the broadcast channel condition.

19. The at least one non-transitory machine readable storage medium of claim 13, further comprising instructions which when executed by the one or more processors cause the UE to perform the following: switching from operating in the first streaming mode to the second streaming mode when the media content segments are lost or when missing media content segments are recovered.

* * * * *